US011786873B2

(12) United States Patent
Höfken

(10) Patent No.: US 11,786,873 B2
(45) Date of Patent: Oct. 17, 2023

(54) SUBMERSIBLE AGITATOR DEVICE FOR CIRCULATING DRINKING WATER

(71) Applicant: INVENT UMWELT—UND VERFAHRENSTECHNIK AG, Erlangen (DE)

(72) Inventor: Marcus Höfken, Erlangen (DE)

(73) Assignee: INVENT UMWELT—UND VERFAHRENSTECHNIK AG, Erlangen (DE)

( * ) Notice: Subject to any disclaimer, the term of this patent is extended or adjusted under 35 U.S.C. 154(b) by 538 days.

(21) Appl. No.: 17/257,710

(22) PCT Filed: Aug. 5, 2019

(86) PCT No.: PCT/EP2019/071029
§ 371 (c)(1),
(2) Date: Jan. 4, 2021

(87) PCT Pub. No.: WO2020/030596
PCT Pub. Date: Mar. 13, 2020

(65) Prior Publication Data
US 2021/0291128 A1   Sep. 23, 2021

(30) Foreign Application Priority Data
Aug. 6, 2018   (DE) ............. 10 2018 119 039 U

(51) Int. Cl.
*B01F 27/09*   (2022.01)
*B01F 27/25*   (2022.01)
(Continued)

(52) U.S. Cl.
CPC ............ *B01F 27/251* (2022.01); *B01F 27/09* (2022.01); *B01F 27/1132* (2022.01); *B01F 27/91* (2022.01)

(58) Field of Classification Search
CPC .... B01F 7/00; B01F 7/22; B01F 27/25; B01F 35/03; B01F 27/09
See application file for complete search history.

(56) References Cited

U.S. PATENT DOCUMENTS

| 3,584,840 A | 6/1971 | Fuchs |
| 8,459,863 B2 | 6/2013 | Hoefken et al. |

(Continued)

FOREIGN PATENT DOCUMENTS

| CH | 497913 A | 10/1970 |
| CN | 204848468 U | 12/2015 |

(Continued)

OTHER PUBLICATIONS

PCT/ISA/210, "International Search Report for International Application No. PCT/EP2019/071029," dated Sep. 4, 2019.

(Continued)

*Primary Examiner* — Walter D. Griffin
*Assistant Examiner* — Cameron J Allen
(74) *Attorney, Agent, or Firm* — Manabu Kanesaka

(57) ABSTRACT

A submersible agitator device for circulating drinking water includes a submersible motor including a cylindrical housing, from one end of which there extends a shaft, a hyperboloid agitator mounted on the shaft, a frame with a plurality of supports extending along the housing and connected to the housing, wherein the supports have radially outwardly angled bend portions, which extend over a peripheral edge of the hyperboloid agitator body in order to support the frame on a base, and a flow-guiding element, which is annular in plan view and which is mounted on the bend portions of the supports.

6 Claims, 3 Drawing Sheets

(51) Int. Cl.
   *B01F 27/91*      (2022.01)
   *B01F 27/1132*    (2022.01)

(56) References Cited

U.S. PATENT DOCUMENTS

| | | |
|---|---|---|
| 10,130,921 B2 | 11/2018 | Hoefken |
| 10,195,573 B2 | 2/2019 | Hoefken |
| 2010/0196165 A1 | 8/2010 | Hoefken |

FOREIGN PATENT DOCUMENTS

| | | |
|---|---|---|
| DE | 102005049373 A1 | 4/2007 |
| DE | 102007013630 A1 | 9/2008 |
| DE | 10201322565 A1 | 6/2015 |
| DE | 102013225662 A1 | 6/2015 |
| EP | 2175973 A1 | 4/2010 |

OTHER PUBLICATIONS

Hofken, M. et al., "Rühr-und Begasungssysteme für die effektive Abwasserbehandlung," vol. 2, Feb. 28, 1998, p. 91-95, Brauindustrie, Retrieved from the Internet: http://fzarchiv.sachon.de/index.php?pdf=Fachzeitschriften/Getraenke-Fachzeitschriften/Brauindustrie/1998/02_98/Bi_02-98_Ruehr-und _Begasungssysteme_fuer_Abwasserbehandlung.pdf [retrieved on 1077-01-01] ISSN: 0341-7115, XP002496266 p. 91-95.

SUBMERSIBLE AGITATOR DEVICE FOR CIRCULATING DRINKING WATER

RELATED APPLICATIONS

The present application is National Phase of International Application No. PCT/EP2019/071029 filed Aug. 5, 2019, and claims priority from German Application No. DE 10 2018 119 039.5 filed Aug. 6, 2018, the disclosure of which is hereby incorporated by reference herein in its entirety.

The invention relates to a submersible agitator device for circulating drinking water, comprising a submersible motor with a housing, from one end of which there extends a shaft, a hyperboloid agitator body mounted on the shaft, and a support structure for supporting the submersible agitator device on the base of a tank.

A submersible agitator device is offered by the applicant under the name "Hyper-dive Mixer". It is used to circulate in particular wastewater in a clarification tank.

In drinking water stores there is the risk of formation of water layers having different temperatures. There is no significant liquid exchange between water layers of this kind. This may result in algae formation, post-bacterial load and/or may lead to an uncontrolled chemical concentration. In order to avoid the above-mentioned disadvantages, drinking water received in a drinking water store is circulated by means of an agitator device.

The object of the present invention is to specify a submersible agitator device for circulating drinking water which has an improved agitation efficiency.

This object is achieved by the features of claim 1. Expedient embodiments of the invention will become clear from the features of the dependent claims.

In accordance with the invention a submersible agitator device for circulating drinking water is proposed and comprises:
- a submersible motor having a cylindrical housing, from one end of which there extends a shaft.
- a hyperboloid agitator body mounted on the shaft,
- a frame with a plurality of supports extending along the housing and connected to the housing, wherein the supports have radially outwardly angled bend portions, which extend over a peripheral edge of the hyperboloid agitator body in order to support the frame on a base, and
- a flow-guiding element, which is annular in plan view and which is mounted on the bend portions of the supports.

The proposed submersible agitator device is of a simple and compact design. Due to the provision of the annular flow-guiding element, circular or spiralled vortices at the periphery of the hyperboloid agitator body are avoided. Consequently, the proposed submersible agitator device has a particularly high agitation efficiency, i.e. a predefined amount of drinking water can be circulated with the proposed submersible agitator device with reduced expenditure of energy.

In accordance with an advantageous embodiment, transport ribs are provided on an upper side of the hyperboloid agitator body facing the submersible motor and extend in the radial direction and bend towards the peripheral edge in a first tangential direction. The proposed embodiment of the transport ribs contributes further to increasing the efficiency of the submersible agitator device. As the hyperboloid agitator body rotates, a flow directed to the upper side thereof is generated and is deflected in a radial direction towards the peripheral edge.

The flow-guiding element is advantageously supported on the bend portions. However, it can also be mounted on a lower edge of the bend portions facing the hyperboloid agitator body. It is expediently welded to the bend portions.

The flow-guiding element advantageously tapers conically in the direction of the housing. This contributes to an avoidance of undesirable vortices, in particular circular or spiralled vortices.

In accordance with a further advantageous embodiment the frame comprises precisely three supports. The proposed construction of the frame is simple and compact. Apart from this, it is ensured that the submersible agitator device is supported on the base of a tank in a manner secure against tilting.

In a plan view of the upper side of the agitator element, the bend portions of the supports advantageously bend in a second tangential direction opposite the first tangential direction. The second tangential direction corresponds substantially to the direction of the water flowing from the peripheral edge of the agitator body. The formation of undesirable flow obstacles and thus of vortices is also counteracted as a result of the proposed embodiment. The efficiency of the proposed submersible agitator device can thus also be increased.

In accordance with a further embodiment the supports are connected to one another by means of a connection element at another end of the housing opposite the shaft-side end. This makes it possible to easily mount a cable for lifting and lowering the proposed submersible agitator device.

The hyperboloid agitator body is expediently made from stainless steel in one piece with the transport ribs in the form of a cast part. Likewise, the housing, the flow-guiding element and the frame can be made from stainless steel. A steel of the composition X6CrNiMoTi17-12-2 is preferably used as high-grade steel. In addition, a steel with the composition X2CrNiMo17-12-2 can also be used. Steels of this kind are particularly suitable for circulating drinking water in drinking water stores.

An exemplary embodiment of the invention will be explained hereinafter with reference to the drawings, in which.

Figure 1:
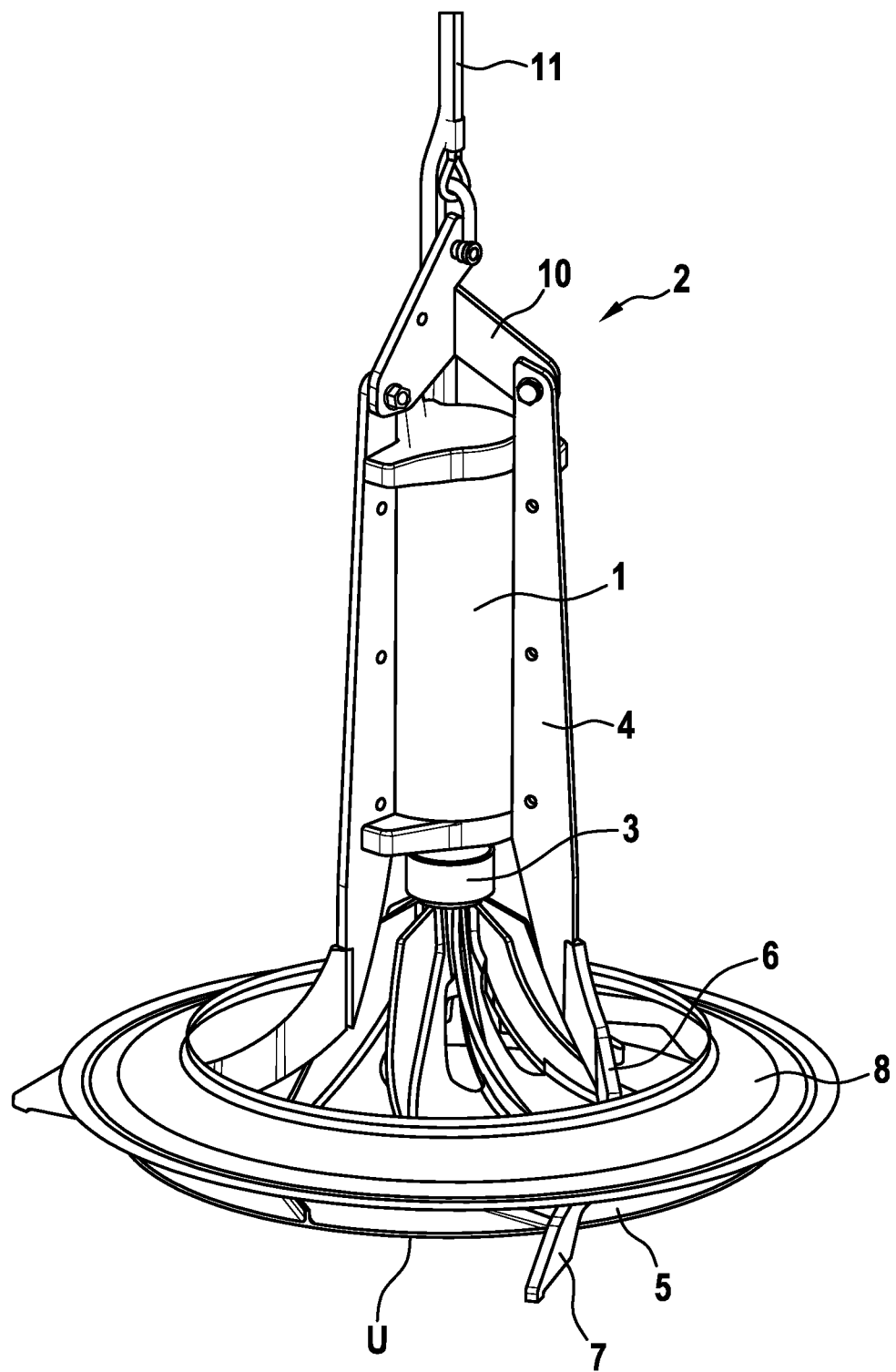
FIG. 1 shows a perspective view of a submersible agitator device.
Figure 2:
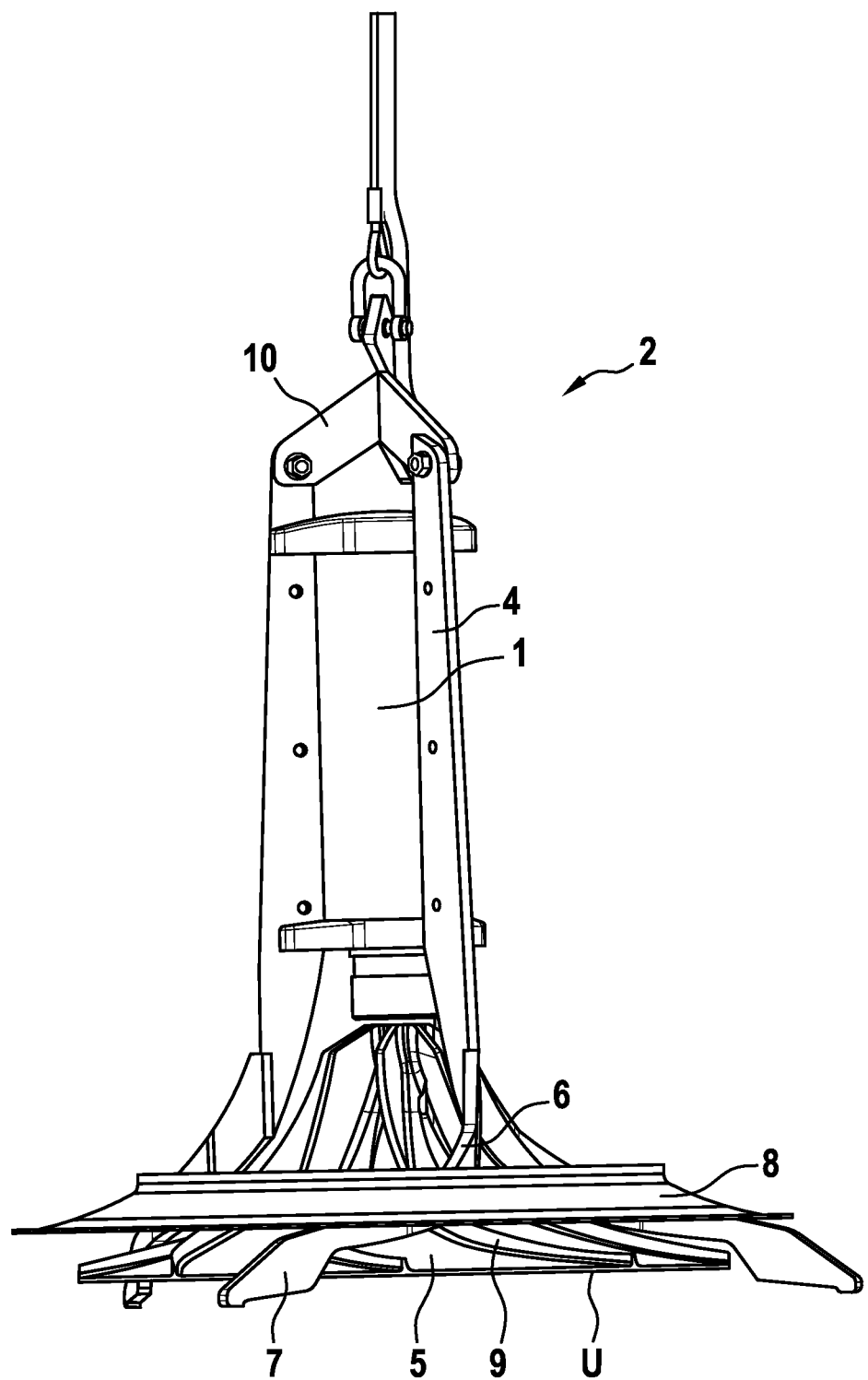
FIG. 2 shows a side view according to FIG. 1.

In the case of the submersible agitator device shown in the drawings a submersible motor is mounted on a frame, denoted generally by reference sign 2. A shaft 3 extends from the submersible motor, which has a cylindrical housing 1. A hyperboloid agitator body 5 is mounted on the shaft 3. Such a hyperboloid agitator body 5 is known for example from DE 10 2013 225 658 A1.

The frame 2 comprises a plurality of supports 4 extending along the housing 1 and connected to the housing 1. The supports 4 extend over the housing 1 in the direction of the hyperboloid agitator body 5. The supports 4, in a portion situated above the hyperboloid agitator body 5, have radially outwardly angled bend portions 6. The bend portions 6 extend over a peripheral edge U of the hyperboloid agitator body 5 and at their end each have a foot 7 for supporting the frame 2 on a base.

A flow-guiding element 8, which is annular in plan view, is supported on the bend portions 6. The flow-guiding element 8 is fixedly connected to the bend portions 6, for example by means of welding.

The hyperboloid agitator body 5 has transport ribs 9 on an upper side facing the housing 1. The hyperboloid agitator body 5 is expediently produced from stainless steel in one piece with the transport ribs 9 in the form of a cast part.

The transport ribs 9 extend along the surface of the hyperboloid agitator body 5 firstly in a radial direction, starting from the shaft 3. They then bend towards the peripheral edge U in a first tangential direction.

Figure 3:
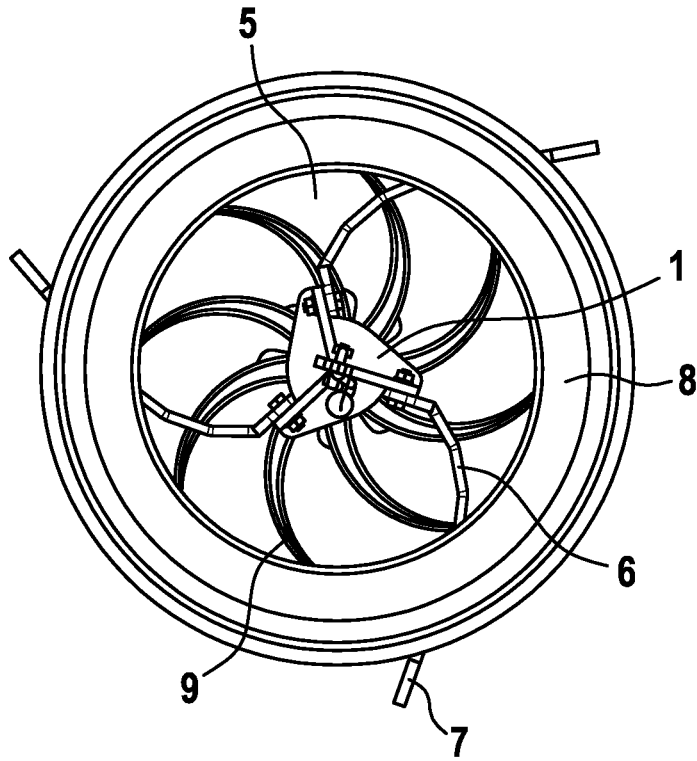
FIG. 3 shows a plan view according to FIG. 1.
Figure 4:
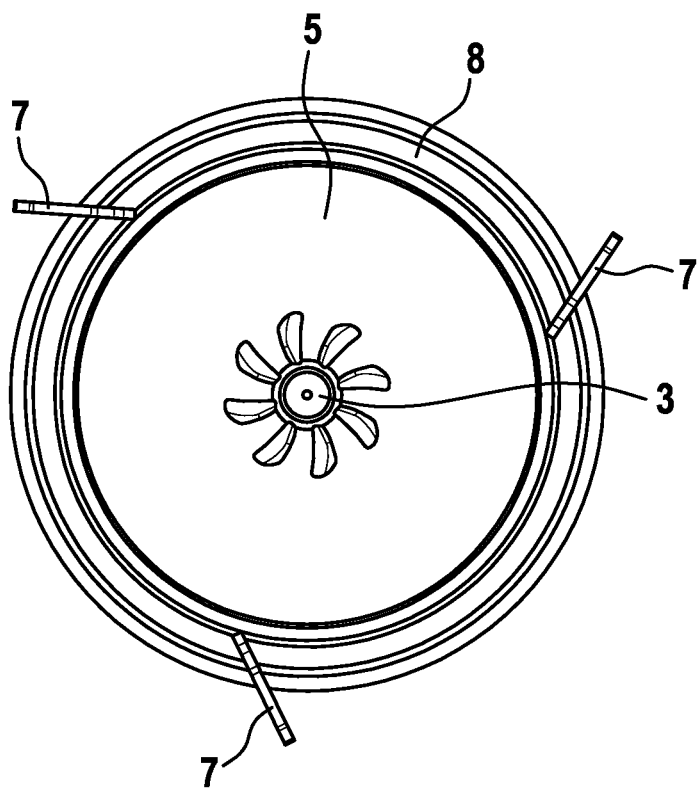
FIG. 4 shows a view from below according to FIG. 1.

As can be seen in particular from FIG. 3, in a plan view of the upper side of the hyperboloid agitator body 5, the bend portions 6 of the supports 4 bend in a second tangential direction, opposite the first tangential direction. The flow-guiding element 8 tapers conically in the direction of the housing 1. Reference sign 10 denotes a connection element, which connects the supports 4 to one another at another end of the housing 1, opposite the shaft-side end. A cable for lifting and lowering the submersible agitator device can be mounted on the connection element 10.

The function of the submersible agitator device is as follows:

The hyperboloid agitator body 5 is rotated in a clockwise direction by means of the submersible motor. Consequently, a flow forms which is directed towards the upper side of the hyperboloid agitator body 5. The flow passes through the flow-guiding element 8. It is deflected in a radial direction by the action of the flow-guiding element 8 and the effect of the hyperboloid agitator body 5. The flow from the peripheral edge U likewise circulates in a clockwise direction. Due to the bend of the bend portions 6 provided in a second tangential direction, the flow encounters only a very low resistance over its path. Due to the effect of the flow-guiding element 8, the formation of spiralled vortices is avoided. Drinking water can be circulated in a drinking water container with improved efficiency by means of the proposed submersible agitator device. Due to the embodiment proposed in accordance with the invention, less electrical energy than in conventional submersible agitator devices is required for the circulation.

LIST OF REFERENCE SIGNS

1 housing
2 frame
3 shaft
4 support
5 hyperboloid agitator body
6 bend portion
7 foot
8 flow-guiding element
9 transport rib
10 connection portion
U peripheral edge

The invention claimed is:

1. A submersible agitator device for circulating drinking water, comprising
   a submersible motor comprising a cylindrical housing (1), from one end of which there extends a shaft (3),
   a hyperboloid agitator (5) mounted on the shaft (3),
   a frame (2) with a plurality of supports (4) extending along the housing (1) and connected to the housing (1), wherein the supports (4) have radially outwardly angled bend portions (6), which extend over a peripheral edge (U) of the hyperboloid agitator body (5) in order to support the frame (2) on a base,
   a flow-guiding element (8), which is annular in plan view and which is mounted on the bend portions (U) of the supports (4),
   wherein transport ribs (9) are provided on an upper side of the hyperboloid agitator body (5) facing the submersible motor and extend in the radial direction and bend towards the peripheral edge (U) in a first tangential direction and
   wherein, in a plan view of the upper side of the hyperboloid agitator element (5), the bend portions (U) of the supports (4) bend in a second tangential direction opposite the first tangential direction.

2. The submersible agitator device according to claim 1, wherein the flow-guiding element (8) tapers conically in the direction of the housing (1).

3. The submersible agitator device according to claim 1, wherein the frame (2) comprises precisely three supports (4).

4. The submersible agitator device according to claim 1, wherein the supports (4) are connected to one another by means of a connection element (10) at another end of the housing (1) opposite the shaft-side end.

5. The submersible agitator device according to claim 1, wherein the hyperboloid agitator body (5) is made from stainless steel in one piece with the transport ribs (9) in the form of a cast part.

6. The submersible agitator device according to claim 1, wherein the housing (1), the flow-guiding element (8) and the frame (2) is made from stainless steel.

* * * * *